H. F. GEIST.
INDUCTOR GENERATOR.
APPLICATION FILED JAN. 21, 1918.

1,354,546.

Patented Oct. 5, 1920.
2 SHEETS—SHEET 1.

Inventor
Harry F. Geist
By Youell, Kenny & French
Attorneys

H. F. GEIST.
INDUCTOR GENERATOR.
APPLICATION FILED JAN. 21, 1918.
1,354,546.
Patented Oct. 5, 1920.
2 SHEETS—SHEET 2.
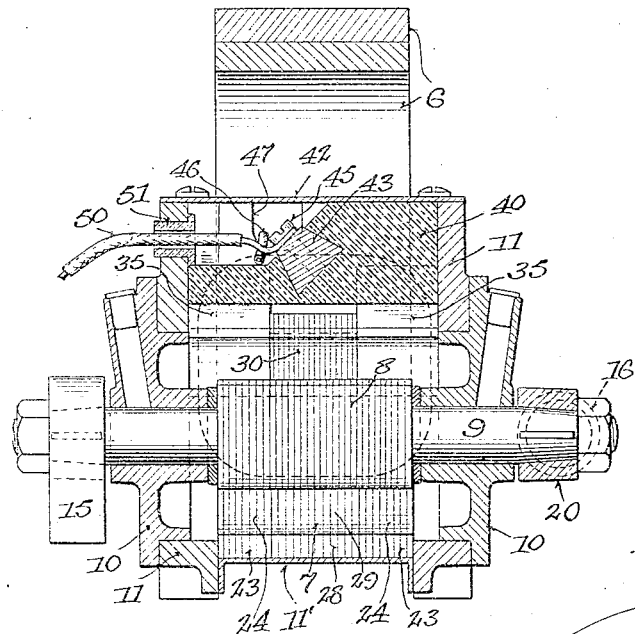
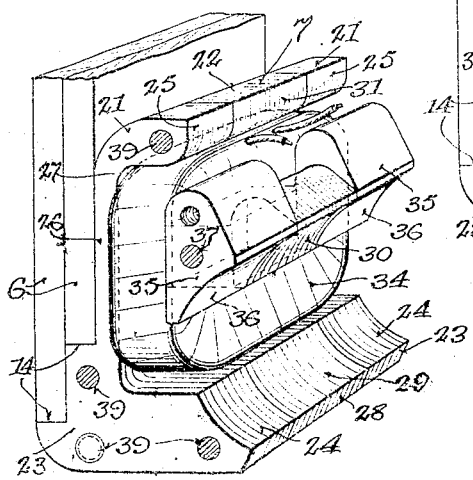
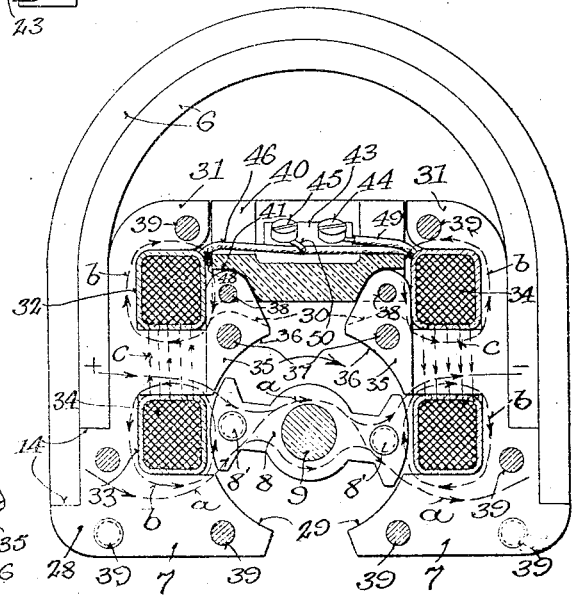
Inventor
Harry F. Geist
By Uproce, Kenney & French
Attorneys.

UNITED STATES PATENT OFFICE.

HARRY F. GEIST, OF SUMTER, SOUTH CAROLINA, ASSIGNOR TO WEBSTER ELECTRIC COMPANY, OF RACINE, WISCONSIN, A CORPORATION OF WISCONSIN.

INDUCTOR-GENERATOR.

1,354,546.	Specification of Letters Patent.	Patented Oct. 5, 1920.

Application filed January 21, 1918. Serial No. 212,956.

*To all whom it may concern:*

Be it known that I, HARRY F. GEIST, a citizen of the United States, and resident of Sumter, in the county of Sumter and State of South Carolina, have invented new and useful Improvements in Inductor-Generators, of which the following is a description, reference being had to the accompanying drawings, which are a part of this specification.

The invention relates to inductor generators or magnetos.

The essential object of the invention is to produce an inductor type of magneto of increased electrical efficiency as a generator and of electrical characteristics that make it especially efficient for oscillating magneto ignition service for explosive engines.

For an efficient magneto, the magnetic circuit should be so designed that the relative motion between the rotor and stator produces a very quick shift of the limited amount of magnetic flux that is present and to do this the overlap of the rotor tips on the pole pieces must be very small, so that for the definite amount of overlap area that is required for the flux, it is evident the length of bore or machine depth must be appreciably long. It is usual in machines of this class to build the pole pieces up of one form of laminæ for the total machine depth and to fit the coil around one or more of the pole pieces parallel to the bore with the whole of the end portions of the coil consequently projecting from the pole piece which results in an inefficiently long coil for the required machine depth or if a shorter coil is used an inefficiency of the machine results because of the shortened depth of bore of the machine *i. e.* the active coil length and the depth of bore are the same. To overcome these difficulties of prior machines I have devised a compound form of pole piece by which it is possible to use as short a coil as desired with any desired depth of machine bore, thus reducing the resistance of the coil to a minimum and still retaining the depth of bore to give the best possible overlap area for a quick magnetic shift.

The increase in electrical efficiency due to decrease in circuit resistance, is well known in the electrical art as it decreases the energy loss in the coil heating.

In the oscillating magneto system, the springs that recoil and open the igniter points have to also impart motion to the rotor of the magneto and consequently the resultant speed of igniter point separation is lower than is found in the ordinary battery or rotary magneto form of make and break igniter. The time required for the electromagnetic energy stored in the magneto circuit to dissipate for any speed of spark point separation is governed by the time constant of the circuit, which constant is defined as the inductance of the circuit divided by the circuit resistance. Consequently the higher the inductance and the lower the resistance, the longer it takes for the energy to dissipate itself and of course the greater is the duration of the spark which is an important factor for efficient ignition. To provide for a higher inductance of the electromagnetic circuit I have placed the coils on the pole pieces so that they are incased by the iron as much as possible with the result that the inductance of the circuit is increased per turn and as previously stated I have reduced the resistance of the coil for any given size of wire used to a minimum. The advantage of this increased inductance and decreased resistance thus results in an increased volume of the spark for the following reason.

If an oscillating magneto ignition system has an electrical circuit with a small time constant, coupled with a slow speed of igniter separation, it is evident that the electrical energy will dissipate itself in the spark before the spark points have become far enough separated to give length and volume to the spark, and the energy of the spark thus condensed attacks the igniter points and is poor as an ignition spark. By increasing the inductance and decreasing the resistance to provide a higher constant as previously described in connection with my construction it is evident that for the same speed of spark point separation, my magneto, with higher time constant and consequent slower dissipation of energy, will insure a longer and larger ignition spark.

One of the chief inherent disadvantages of the inductor type of magneto is that the inductance of the circuit varies very rapidly with the different positions of the rotor during its motion, and especially over that range of its motion where it is most effective in energy generation.

Inductance is a measure of the degree of interlinkage between the loops of reactive flux and the turns of the coil, and is always greatest when the most complete iron path exists for the reactive loops of flux. The faces of the rotor projections and the clearance air gap between the rotor and stator are a part of this magnetic path, and therefore it follows that the rotor position has a very marked effect upon the inductance of the coil.

Since the rotor acts primarily to shift the excitation flux with respect to the coils in generating the electrical current that gives rise to the reactive flux, it is evident that the reactive flux interferes with the shifting of the excitation flux.

To modify this action, I have formed the pole pieces with polar projections that do not coact with the rotor and in these projections which are the upper ones as appear from the accompanying drawings, part of the reactive flux is removed from the lower part of the coil to the upper part where its effect is purely inductive, so that these upper projections serve as a sort of magnetic reservoir to increase and stabilize the inductance.

The invention further consists in the several features hereinafter set forth.

In the drawings:

Fig. 3 is a section taken on line 3—3 of Fig. 1;

Fig. 4 is a partial sectional view of the machine taken at right angles to the rotor axis and in front of the middle pole pieces; and Fig. 5 is a perspective view of one of the pole pieces and coil connected to one of the poles of the permanent magnets.

Figure 1:
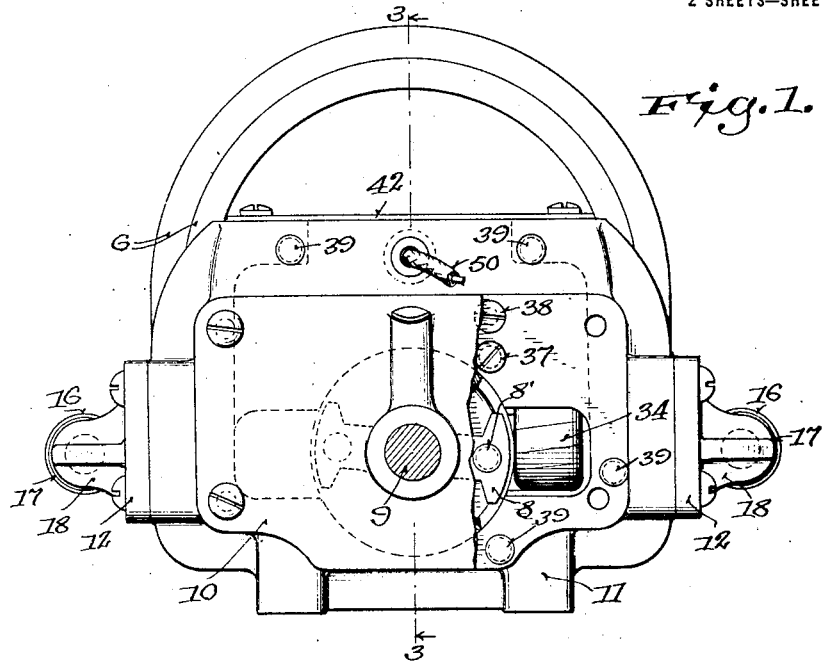
Figure 1 is an end view of a device embodying the invention.

In the drawings, the numeral 6 designates a pair of permanent horse shoe magnets forming the field magnet, 7 the pole pieces as a whole, 8 the I-shaped armature of the rotor composed of a plurality of I-shaped laminæ of magnetic material, 9 the rotor shaft journaled in bearing plates 10 which are secured to end plates 11 of non-magnetic material to which the side plates 12 of non-magnetic material are also secured by screws 13.

The pole pieces 7 have shouldered recesses 14 to receive the ends of the magnets 6 which are held in place between the side plates 12 and said pole pieces. The non-magnetic end plates 11 and side plates 12 constitute the frame of the magneto which is adapted to be secured upon any suitable support, a shelf (not shown) forming part of the igniter being usually employed.

The laminæ of the armature 8 are secured on the shaft 9 either by knurling the shaft and pressing the plates thereon or by a keyed connection with the shaft, both of which are well-known in this art, and are secured together by rivets 8'.

The rotor is oscillated in one direction by mechanism (not shown) controlled and operated by the engine which includes a member that strikes a pawl 15 on the shaft 9 and the rotor is quickly returned in the opposite direction by means of coacting springs 16 secured at one of their ends to rollers 17 mounted on lugs 18 carried by the side plates 12 and at their other ends to rollers 19 carried by a double crank 20 mounted on the shaft 9.

Each pole piece 7 is made up of three sections, consisting of end sections 21 and a middle section 22. Each end section consists of laminæ 23, each having a rotor coacting polar projection 24, a polar projection 25 which does not coact with the rotor, a portion 26 connecting said projections to form a coil receiving recess 27. The middle section consists of laminæ 28, each having rotor coacting polar projections 29 and 30, and a polar projection 31 which does not coact with the rotor, said polar projections being spaced apart to form recesses 32 and 33 for receiving a coil 34. A bottom plate 11' is secured between the plates 11. The laminæ 28 are the main laminæ having the three projections 29, 30 and 31, the projections 29 and 30 terminating at the bore of the machine to coact with the rotor and the projection 31 serves to more completely surround the coil 34 which is mounted upon the projection 30 within the recesses 27, 32 and 33 as shown in Figs. 4 and 5. The laminæ 23 are auxiliary laminæ and have the polar projections 24 and 25 which match up with the upper and lower projections of the main laminæ and serve to surround the ends of the coil with iron and to give the desired depth or length of bore to the machine.

Solid soft iron extension blocks 35, having coacting rotor faces 36 in line with that of the polar projections 30 of the middle section, are secured thereto by a long fillister head tight fitting screw 37 which, passing through the projections 30 and the end plates or spiders 11, clamps said blocks and main laminæ between said spiders and short screws 38 secure the upper part of these blocks to the spiders to prevent their turning on the screw 37. These extension blocks might be made of built up laminæ but I preferably use the solid blocks.

The soft iron blocks extend from the middle projection to the end plates and serve to build up the end of the middle projections of the main laminæ to the total depth of bore and still permit coil space upon this middle projection and they also assist in incasing the coil in iron.

The sections of laminæ of each pole piece are secured together by rivets 39 so as to clamp them between the spiders 11 into a mechanically and magnetically complete body. In assembling the machine the pole pieces with the exception of the extension blocks are clamped between the spiders, and all the rivets put in place and securely riveted down with the exception of the securing means for the extension blocks after which the coils are mounted in place on the middle pole piece projections and the extension blocks secured by the screws 37 and 38, these screws being removable to permit removal of the coils if necessary. By having the coils mounted upon the middle projections with the removable blocks 35, I am able to fixedly secure the laminated pole pieces between and to the end blocks to form an integral construction which is highly desirable. Another advantage in rigidly securing the laminæ to the end plates is that I can ream the bore to size with the parts thus assembled.

The coils 34 are form wound, taped, varnished and baked before assembly to the frame as is usual and their leads brought out so that when the coils are assembled they can be connected together in the space opposite the upper projections 25 and 31. An insulated terminal block 40 recessed at its ends 41 to receive the upper ends of the extension blocks 35 fits within the space between the upper projections 25 and 31 of the opposite pole pieces and is secured thereto against removal by a cover plate 42. This block is of molded insulating material having a metal terminal block 43 inserted therein and carrying binding posts 44 and 45. The coils 34 are connected in series by the conductor 46 which passes through transverse recesses 47 in the block 40. One end 48 of one of the coils is grounded on the frame and one end 49 of the other coil is connected to the block 43 by the post 44. A conductor or lead 50 secured to the block 43 and passing out through an insulated opening 51 in one of the end plates carries the current to the igniter which may be of any suitable construction.

Figure 2:
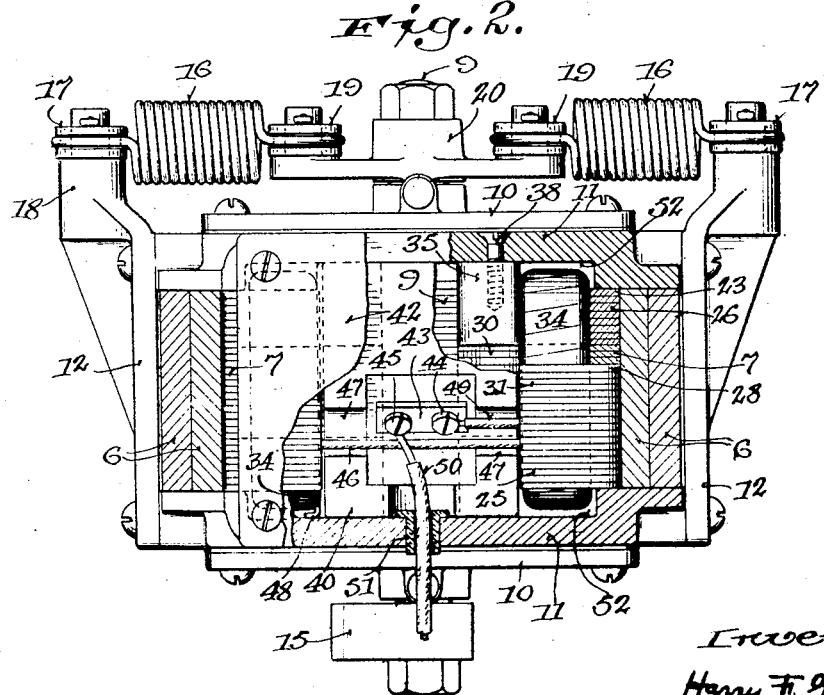
Fig. 2 is a plan view thereof, parts being broken away and parts being shown in section.

The end plates 11 have recesses 52 therein and in Fig. 2 the ends of the coils are shown projecting slightly into these recesses and extending slightly beyond the outer edges of the pole pieces but not exposing the whole end of the coil as is the case with the usual construction. These recesses 52 are to allow space to facilitate assembling the coil and take care of variations that may arise in coil manufacture.

In this form of construction of pole pieces, it is evident that the active length of the coil is determined by the depth to which the main laminæ are stacked and that this length is practically independent of the depth of the bore of the machine within the limits of what would constitute sufficient coil space or coil cross section to represent good design.

This construction permits a design using as short an active length of coil as is desired, insuring a minimum coil resistance for any size of wire used and still retaining the depth of bore to give the best possible overlap area between the rotor and pole piece tips for a quick magnetic shift. In former constructions as previously pointed out it is usual to build the pole pieces up of one form of laminæ for the total machine depth and to fit the coil around one or more of these pole pieces, parallel to the bore with the whole of the end portions of the coil consequently projecting from the pole pieces so that when a deep bore is used there results an inefficiently long active length of coil for the required depth of bore of the machine or if a short coil is used an inefficient machine is produced because of the shortened depth of bore of the machine. With my compound form of pole piece in which the ends of the coil fit within part of the laminæ and upon the projecting pole piece of the middle section it is possible to use as short an active coil length as desired with any desired depth of machine bore.

In connection with the previous description it will be noted that the coils are almost incased in the iron of the pole pieces with the result that the inductance of the circuit is increased per turn of the coil. As stated in the beginning of this description an increase in the inductance together with the decrease in the resistance of the coil gives a higher time constant than could otherwise be obtained and this higher time constant results in a longer duration and increased volume of the spark which of course produces more efficient ignition.

The general operation of the machine is similar to the other oscillating magnetos in that the motion of the rotor in one direction and its quick return in the opposite direction first passes all the excitation flux either entirely out of or through the coils and then shifts the flux either into or out of the coils very quickly.

This shift of flux with respect to the coils generates electrical energy during closed circuit that is stored due to the inductance of the circuit and is utilized in the form of an ignition spark when the igniter opens the circuit.

This machine is however different from the usual inductor types of this form, in that the upper projections do not coact with the rotor but serve only to surround the coil more completely with iron and act as reservoirs for storing electro-magnetic energy and to increase and stabilize the circuit inductance as will be apparent from Fig. 4.

In this figure the arrows *a* represent the direction of travel of the excitation flux from the + pole to the − pole and the arrows *b* represent the direction of travel of the reactionary flux about the coils and *c* the direction of flow of the current in one of the coils. From this diagrammatic representation it will be apparent, that, when the rotor is shifted with respect to the coacting pole pieces the reactive flux, set up in loops that interlink with the coil, is in the path of the excitation flux and interferes with its shifting but in the upper polar projections which do not coact with the rotor this reactive flux does not interfere with the excitation flux and said projections thus serve as a sort of magnetic reservoir, to increase and stabilize the inductance of the circuit.

While I have shown a magneto having pole pieces in which two of the coacting polar projections coact with the rotor it is evident that the invention may be carried out with the same advantages on magnetos in which there are more than two rotor coacting polar projections.

It will also be understood that advantages derived from the mounting of the coil so that a longer or shorter coil can be used with the desired depth of machine bore can be had if the upper polar projections 25 and 31 are omitted.

From the foregoing description it will be apparent that my invention not only increases the electrical efficiency of the magneto, as a generator, but also gives it improved characteristics for such service as is found in its use in oscillating magneto ignition systems.

I am aware that the specific details of construction embodying the invention are subject to some modification and change and I therefore desire it to be understood that such changes as come within the scope of the appended claims I deem to be within the spirit of my invention.

What I claim as my invention is:

1. In an inductor generator, the combination of a field magnet provided with pole pieces, an inductor, said pole pieces including coil carrying projections coacting with said inductor, coils mounted on said coil carrying projections, by-pass polar projections coacting with said inductor, and other polar projections adjacent said coils which do not coact with said inductor but serve to iron clad the coil for the purpose described without affecting the shifting of the field flux by the inductor.

2. In an inductor generator, the combination of a field magnet provided with pole pieces, an inductor, said pole pieces including polar projections coacting with said inductor, coils mounted upon said coacting projections, and other polar projections adjacent said coils which do not coact with said inductor, but serve to iron clad the coils for the purpose described without affecting the shifting of the field flux by the inductor.

3. In an inductor generator, the combination of a field magnet provided with pole pieces, an inductor, polar projections on said pole pieces coacting with said inductor, other polar projections on said pole pieces which do not coact with said inductor, and coils having a part contacting with said non-coacting projections which serve to iron clad the coil and form paths for reactive flux that do not interfere with the shifting of the flux from the magnets by the inductor.

4. In an inductor generator, the combination of a field magnet provided with pole pieces having polar projections, an inductor coacting with said projections, each pole piece being formed to provide recesses for receiving the sides and ends of a coil, and a coil mounted on one of said polar projections and disposed within said recesses whereby the active length of coil is less than and independent of the total depth of the pole pieces to thereby retain the best possible overlap area for a quick magnetic shift with a minimum length of coil turn.

5. In an inductor generator, the combination of a field magnet provided with pole pieces, an inductor, each pole piece comprising a middle section and end sections, said end sections each having a polar projection that coacts with the inductor, said middle section having a plurality of polar projections that coact with the inductor, extension polar projections adjacent the middle section, and a coil mounted on one of the polar projections of the middle section and extending across the end sections behind said extension polar projections and having a portion disposed adjacent the polar projection of the end sections that coact with the inductor.

6. In an inductor generator, the combination of a field magnet provided with laminated pole pieces, each pole piece comprising a middle section and end sections of laminæ, said end sections each having upper and lower polar projections, said middle section having upper, lower and middle polar projections, extension polar projections adjacent the middle section, a coil for each pole piece mounted on said middle polar projection of the middle section and disposed between the upper and lower polar projections of the middle and end sections, and behind said extension polar projections, and an inductor coacting with said pole pieces.

7. In an inductor generator, the combination of a field magnet provided with laminated pole pieces, each pole piece comprising a middle section and end sections, each end section being composed of U-shaped laminæ to form spaced polar projections, said middle section being composed of laminæ having upper and lower polar projections in line with the polar projections of the end sections and an intermediate polar projection, a coil for each pole piece mounted on said intermediate polar projection and disposed within the space between the upper and lower polar projections of the middle and end sections, extension polar projections for said intermediate polar projections disposed in front of the coil, and an inductor coacting with said pole pieces.

8. In an inductor generator, the combination of a field magnet provided with pole pieces, each pole piece comprising a middle section and end sections, each end section being composed of laminæ having upper and lower polar projections, said middle section being composed of laminæ having upper and lower polar projections alined with those of the end sections and an intermediate polar projection, a coil for each pole piece mounted on said intermediate polar projection and disposed within the space between the upper and lower polar projections of the middle and end sections, extension polar projections for said intermediate polar projections disposed in front of the coil, an inductor, one of the alined polar projections of the middle and end sections and the intermediate polar projection of the middle section and said extension polar projections coacting with said inductor.

9. In an inductor generator, the combination of a field magnet provided with laminated pole pieces, each pole piece comprising a middle section and end sections provided with polar projections and coil receiving recesses adjacent thereto, a coil mounted on one of the polar projections of said middle section and within said recesses, a frame including end plates, rivets clamping said end laminated pole pieces between said end plates, extension polar projections in line with the polar projections of the middle section on which the coil is mounted and detachably secured to said end plates in front of the coil to permit removal of the coil, an inductor coacting with said pole pieces, and means removably supporting the inductor on the frame.

10. In an inductor generator, the combination of a field magnet provided with pole pieces, an inductor, polar projections on said pole pieces coacting with said inductor and including coil carrying projections, other projections on said pole pieces which do not coact with the inductor, and a coil mounted on said coil carrying projections and having a part contacting with said non-coacting projections, said non-coacting projections serving to ironclad the coil and form a path for reactive flux that does not interfere with the shifting of the flux from the magnets by the inductor thus serving to increase and stabilize the inductance of the electro-magnetic circuit and to thereby increase the energy storage capacity of the electro-magnetic circuit.

11. In an inductor generator, the combination of a field magnet provided with pole pieces, an inductor, polar projections on each pole piece coacting with the inductor, a central polar projection of less depth than the pole pieces connecting extension polar projections, which coact with the inductor, to the main body of each pole piece, and a coil mounted on said central polar projection and disposed between the body of the pole piece and the polar extensions carried by the central projection and with said coil end portions lying substantially within the depth of the pole piece.

In testimony whereof, I affix my signature.

HARRY F. GEIST.